UNITED STATES PATENT OFFICE.

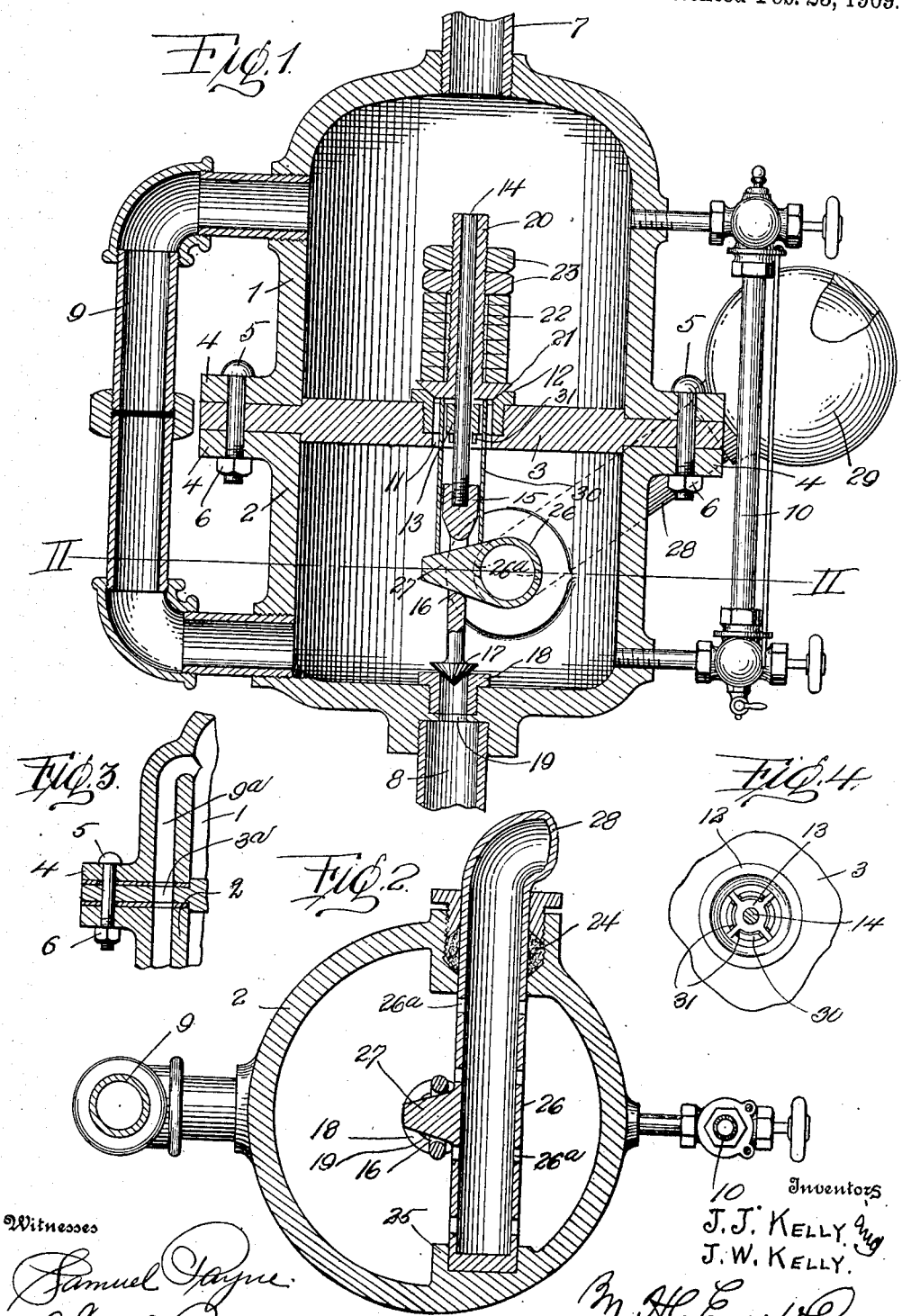

JAMES J. KELLY AND JOHN W. KELLY, OF CRAFTON, PENNSYLVANIA.

STEAM-TRAP.

No. 913,509.  Specification of Letters Patent.  Patented Feb. 23, 1909.

Application filed July 10, 1908. Serial No. 442,813.

*To all whom it may concern:*

Be it known that we, JAMES J. KELLY and JOHN W. KELLY, citizens of the United States of America, residing at Crafton, in the county of Allegheny and State of Pennsylvania, have invented certain new and useful Improvements in Steam-Traps, of which the following is a specification, reference being had therein to the accompanying drawing.

This invention relates to steam traps designed for removing water from steam cylinders and pipes.

The objects of our invention are, first, to provide an automatic trap for collecting water, wherein positive and reliable means is employed for automatically discharging a predetermined collected quantity of water; second, to provide a trap having an automatic release valve that can be easily adjusted; and third, to provide a trap that will return the water of condensation from heating coils or cylinder to the boiler, whether the same are above or below the water level in the latter; and fourth, to provide a steam trap for returning water to a boiler without a considerable loss of temperature, effecting thereby the saving of fuel, besides the advantage of keeping a boiler fed with pure water.

We attain the above objects by a device that will be presently described in detail and then specifically pointed out in the appended claims.

In the drawings:—Figure 1 is a vertical sectional view of a trap constructed in accordance with our invention, Fig. 2 is a horizontal sectional view taken on the line II of Fig. 1, Fig. 3 is a sectional view of the trap illustrating an integral by pass, and Fig. 4 is a plan of a portion of the horizontal partition forming part of the trap.

In the accompanying drawings, 1 and 2 designate sections of a cylinder and 3 a horizontal partition interposed between said sections. The confronting ends of the sections 1 and 2 are enlarged, as at 4, and are secured to the edges of the partition 3 by bolts 5 and nuts 6. The section 1 is adapted to be connected by a pipe 7 to a cylinder or heating coil (not shown), while the section 2 is connected by a pipe 8 to a boiler (not shown), and this pipe in some instances can serve as a drain pipe. The upper end of the section 1 and the lower end of the section 2 are in communication with one another, by a by pass 9 and a water gage 10, the former being constructed of pipes, elbows and a union coupling, while the latter is of a conventional form for determining the elevation of water within the trap.

The horizontal partition 3 is provided with a central opening 11 and with a detachable valve seat 12, said valve seat having a spider 13 serving as a bearing for a vertical valve rod 14. The lower end of said rod is threaded into the head 15 of a link 16, the lower end of said link terminating in a valve 17 adapted to engage a valve seat 18, detachably mounted in the bottom of the section 2 and communicating with the pipe 8 through an opening 19 provided therefor.

Movably mounted upon the valve rod 14 is an exteriorly threaded sleeve 20 having a valve 21 at the lower end thereof adapted to rest upon the seat 12. The valve 21 supports a plurality of rings or weights 22, said rings or weights surrounding the sleeve 20 and being retained upon said valve by nuts 23 secured upon the sleeve 20.

One side of the cylinder section 2 is provided with a stuffing box 24 and journaled in the stuffing box and an interior bearing 25 provided therefor is a pipe 26, said pipe having a projection 27 extending through the link 16. This pipe within the cylinder section 2 is perforated as at 26ª for a purpose that will presently appear. The outer end of the pipe 26 extends upwardly at an inclination, as at 28, and is provided with a spherical reservoir 29, the object of which will presently appear.

Operation: The rings or weights 22 normally hold the valve 17 and 21 in a closed position, the rings or weights 22 being of sufficient weight to retain the spherical reservoir 29 at the inclination illustrated in Fig. 1 of the drawings. The condensate entering the cylinder section 1 accumulates in said section upon the partition 3, and steam is allowed to pass through the by pass 9 into the cylinder section 2, maintaining said partition in a heated condition and thereby retaining the condensate within the cylinder section 1 at approximately the same temperature as the water within the boiler. After the condensate has accumulated within the cylinder section 1, it overflows through the by pass 9 and accumulates in the cylinder section 2, the pipe 26 and the spherical reservoir 29. Immediately upon a sufficient quantity of water having accumulated in the reservoir 29 to overbalance the rings or weights 22, the reservoir 29 lowers and causes the projection 27 to first elevate the sleeve 30 and then the link 16. In first raising the sleeve 30 and opening valve 21 in advance of the valve 17, communication is established between the sections 1 and 2, and communication is established between the pipe 8 and section 2, as the valve 17 is lifted from its seat. Under such conditions the reservoir 29 can drain as well as the section 2. Immediately upon the water draining from the reservoir 29, the rings or weights 22 immediately close the valve 21 and 17, consequently a small quantity of water will always be retained at the bottom of the cylinder section 2.

In Fig. 3 of the drawings, we have illustrated a modification of our invention, wherein the sections 1 and 2 of the cylinder are formed with an integral by pass $9^a$; the partition 3 having a suitable opening $3^a$ establishing communication between the channels of the cylinder sections.

It is thought that the operation and utility of our invention will be fully understood, and while in the drawings forming a part of this application there is illustrated the preferred embodiments of our invention, it is obvious that the same can be changed or varied without departing from the spirit of the invention.

Having now described our invention what we claim as new, is:—

1. A steam trap embodying cylinder sections adapted to be connected together, one of said sections having an inlet pipe and the other of said sections an outlet pipe, a horizontal partition arranged between said sections, said partition having an opening formed therein, a valve seat arranged in said opening, a valve rod extending upwardly through said opening, a link carried by the lower end of said rod, a valve carried by said link for controlling the admission of water to said outlet pipe, a valve loosely mounted upon said rod and adapted to engage said seat, weights mounted upon said valve, a perforated pipe journaled in one of said sections, a projection carried by said pipe and extending into said link, a sleeve interposed between the last mentioned valve and said projection for moving said valve in advance of the first mentioned valve, a reservoir supported by said perforated pipe and adapted to open said valves when filled, a by pass for establishing communication between said cylinder sections, and a water gage in communication with said cylinder sections.

2. A steam trap embodying cylinder sections adapted to be connected together, one of said sections having an inlet pipe and the other of said sections an outlet pipe, a horizontal partition arranged between said sections, said partition having an opening formed therein, a valve seat arranged in said opening, a valve rod extending upwardly through said opening, a link carried by the lower end of said rod, a valve carried by said link for controlling the admission of water to said outlet pipe, a valve loosely mounted upon said rod and adapted to engage said seat, weights mounted upon said valve, a perforated pipe journaled in one of said sections, a projection carried by said pipe and extending into said link, a sleeve interposed between the last mentioned valve and said projection for moving said valve in advance of the first mentioned valve, a reservoir supported by said perforated pipe and adapted to open said valves when filled, and a by pass for establishing communication between said cylinder sections.

3. A steam trap comprising cylinder sections adapted to be connected together, a partition interposed between said sections, said partition having an opening formed therein, a weighted valve adapted to normally close said opening, one of said cylinder sections having an inlet pipe connecting therewith, and the other of said sections having a water outlet pipe connecting therewith, a valve for controlling the passage of water into said pipe, a perforated pipe journaled in one of said sections, a projection carried thereby for raising said valves, a reservoir communicating with said perforated pipe and adapted to move said valve when filled, means interposed between said projection and said weighted valve for moving said valve in advance of the other of said valves, and a by pass for establishing communication between said cylinder sections.

4. A steam trap comprising a cylinder, a horizontal partition arranged centrally of said cylinder, said partition having an opening formed therein, a weighted valve for normally closing said opening, said cylinder having an outlet pipe, a valve for shutting off the connection between said cylinder and said outlet pipe, a perforated pipe journaled in said cylinder, a reservoir communicating with said pipe and adapted to move said pipe when filled, and means actuated by the movement of said pipe for moving said valves.

In testimony whereof we affix our signatures in the presence of two witnesses.

JAMES J. KELLY.
JOHN W. KELLY.

Witnesses:
MAX H. SROLOVITZ,
A. J. TRIGG.